Figure 1:
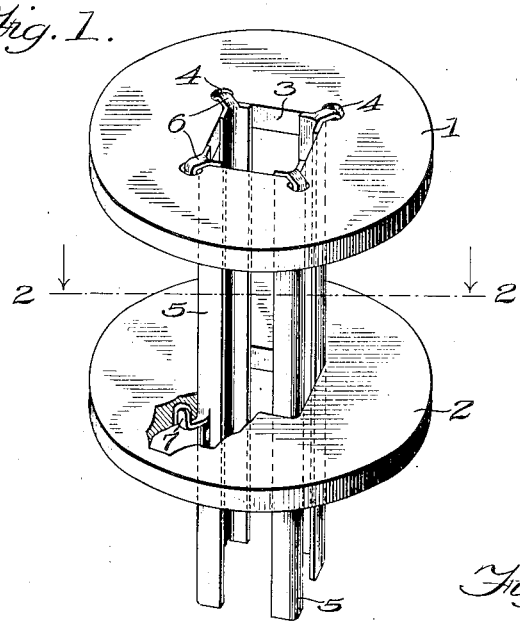

C. J. ANDERSON.
SPOOL FOR ELECTROMAGNETS.
APPLICATION FILED SEPT. 10, 1909.

1,104,032.

Patented July 21, 1914.

Witnesses:
George Haynes

Inventor:
Carl J. Anderson.
By Edwin B. H. Tower, Jr.
Atty.

UNITED STATES PATENT OFFICE.

CARL J. ANDERSON, OF CHICAGO, ILLINOIS, ASSIGNOR TO THE CUTLER-HAMMER MFG. CO., OF MILWAUKEE, WISCONSIN, A CORPORATION OF WISCONSIN.

SPOOL FOR ELECTROMAGNETS.

1,104,032. Specification of Letters Patent. Patented July 21, 1914.

Application filed September 10, 1909. Serial No. 517,051.

*To all whom it may concern:*

Be it known that I, CARL J. ANDERSON, a citizen of the United States, residing at Chicago, in the county of Cook and State of Illinois, have invented new and useful Improvements in Spools for Electromagnets, of which the following is a full, clear, concise, and exact description, reference being had to the accompanying drawing, forming a part of this specification.

My invention relates to improvements in winding spools, and more particularly to spools adapted for use in electromagnets.

While a spool made in accordance with my invention is adapted for use in all kinds of electromagnets, it is particularly useful in alternating current magnets where it is customary to use a plunger square in cross section and formed from a series of laminations. With such a form of plunger, it has heretofore been difficult to secure a form of spool, allowing the winding to be placed in close proximity to all portions of the plunger.

For the purpose of more fully disclosing my invention, I shall describe the embodiment thereof illustrated in the accompanying drawing. It should be understood, however, that my invention is not limited to the particular structure shown in the drawing, but is capable of various modifications.

Figure 2:
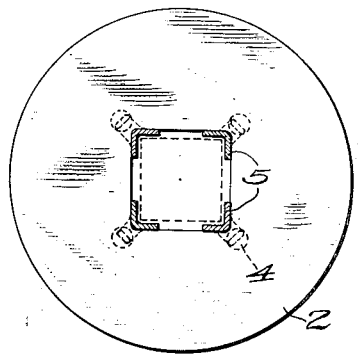
Figure 3:
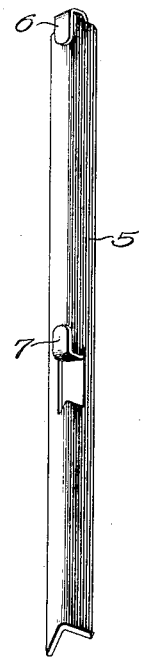

In said drawing, Figure 1 is a perspective view of my complete winding spool, a part thereof being broken away; Fig. 2 is a central sectional view through the spool, showing one end thereof; and, Fig. 3 is a perspective view on an enlarged scale, of one of the angle bars.

In the embodiment of my invention shown, 1 and 2 are the upper and lower disks of the spool which are preferably formed of suitable insulating material. Each disk is provided with a centrally disposed aperture 3, which is preferably square in form. Each disk is also provided with four apertures 4 in one face, which are radially disposed from the corners of the central aperture, for a purpose hereinafter set forth. The core or barrel of the spool is preferably formed of angle bars or strips 5, which have extensions, or tongues 6 at one end and tongues 7 near their other end. Each tongue 6 is bent at right angles to the bar and the extreme end thereof is bent downwardly so as to extend into one of the apertures 4 in the upper face of the disk 1. The end of the tongue is then pressed toward the bar so that the portion of the disk between the apertures 3 and 4 will be tightly gripped between the adjoining faces of the bar and tongue. The lower disk is secured to the bars in a similar manner to the upper disk with the exception that the tongues 7 are preferably struck from the corners of the bars, some distance from the ends thereof, so that the ends of the bars project a considerable distance below the lower disk. This construction provides a guideway for a suitable plunger when the spool is used in a solenoid.

In Fig. 2, I have indicated by dotted lines the position occupied by the preferred form of plunger used in alternating current magnets. It will be seen that the plunger fits very snugly, no excess air spaces being left between the plunger and a coil wound on the bars 5.

While I have described and shown the winding spool as formed of a plurality of angle bars, it will be understood that the same may be formed of plain bars or strips of material and that the same may be fastened to the disks in many other ways than that shown.

Having thus described my invention, what I desire to secure by Letters Patent, is:—

1. In a spool for electromagnets, in combination, a pair of disks adapted to form the ends of the spool, each of said disks having an angular aperture therein and angle strips adapted to be disposed in the angles of said apertures and secured to said disks.

2. In a spool for electromagnets, in combination, disks adapted to form the ends of said spool, said disks having similar angular apertures therein, and angle strips adapted to form the barrel of said spool disposed in the angles of said apertures and secured to said disks.

3. In a spool for electromagnets, in combination, angle strips adapted to form the barrel of the spool, disks forming the ends of said spool, said disks having angular apertures therein, the strips fitting in the angles of said apertures, and means for securing the disks and strips together.

4. A spool for electromagnets comprising a plurality of parallel strips arranged in spaced relation to form a hollow frame and a plurality of disks rigidly secured to said strips in a parallel relation, one of said disks being secured to said strip at a distance from the nearest extremities thereof.

5. A spool for electromagnets comprising end disks each having a polygonal central opening therein and sheet metal angle strips connecting said disks, each of said strips extending through the central opening of each disk and having tongues projecting into each disk to secure the same thereto and to clamp the same in one of the angles of the central opening therein.

6. A spool for electromagnets comprising parallel end disks having polygonal central apertures and a plurality of angle strips passing through the apertures in both disks and closely fitting in the angles of said apertures, said strips being provided with lugs rigidly interlocking with said disks.

In witness whereof, I have hereunto subscribed my name in the presence of two witnesses.

CARL J. ANDERSON.

Witnesses:
N. M. McFEDRIC,
W. R. HARVEY.